May 25, 1965  J. D. ALLEN  3,184,921
REMOTE CONTROL HYDRAULIC SYSTEM
Filed Jan. 20, 1964
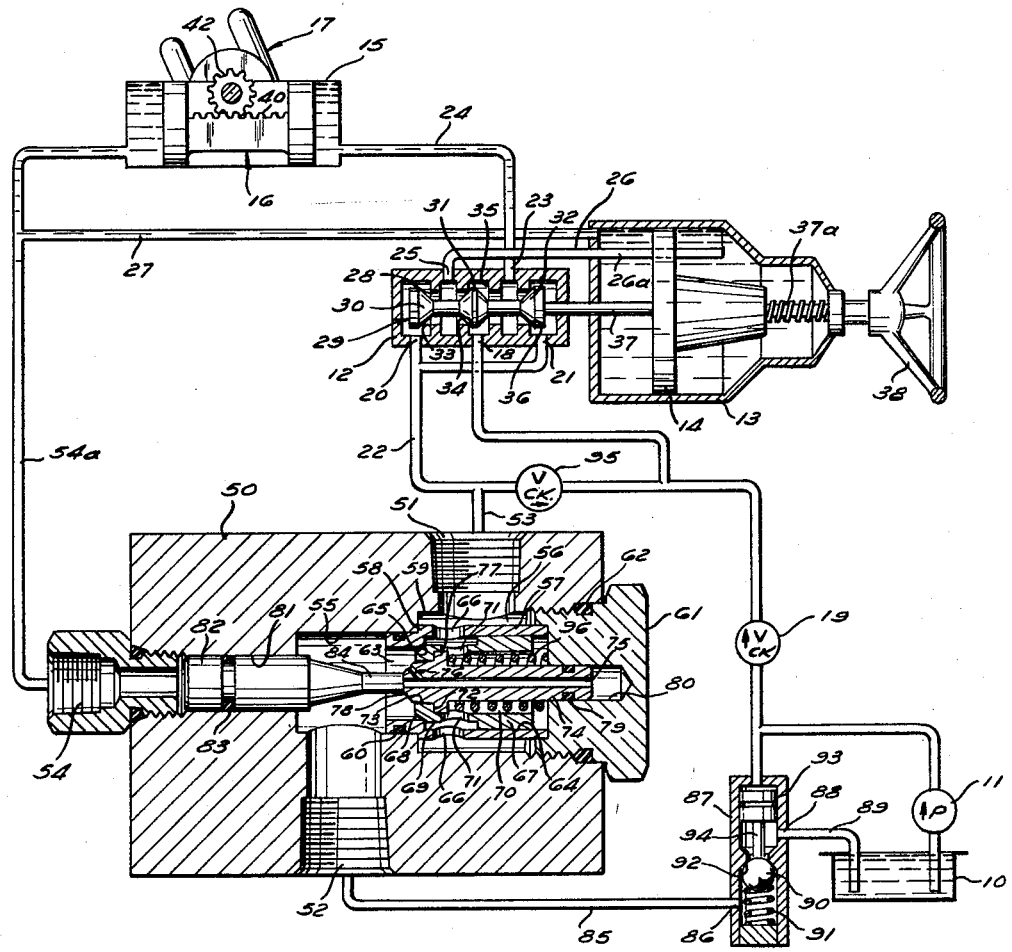
INVENTOR.
JOHN D. ALLEN
BY William J. Flynn
ATTORNEY

3,184,921
REMOTE CONTROL HYDRAULIC SYSTEM
John D. Allen, South Euclid, Ohio, assignor to Fawick Corporation, a corporation of Michigan
Filed Jan. 20, 1964, Ser. No. 338,729
12 Claims. (Cl. 60—54.5)

This invention relates generally to a remote control system for a hydraulically-operated device, and more particularly to a hydraulic power steering system for farm tractors and other vehicles.

One serious disadvantage of previous hydraulic power steering systems has been that, under certain operating conditions, there may be a loss of synchronization between the master and slave pistons. When the master and slave pistons get out of phase, the driver of the vehicle has actually lost control over its steering since the ground wheels will not promptly follow the movement of the steering wheel. The present invention completely avoids this difficulty in a novel, simplified and reliable manner.

It is an object of this invention to provide a novel and improved remote control hydraulic system in which the master and slave pistons are maintained in synchronism at all times.

Another object of this invention is to provide such a system which is particularly advantageous for steering a farm tractor or other ground vehicle and which is simpler and more reliable than previous systems for this purpose.

Another object of this invention is to provide such a system which may be operated by manual power in the event of a failure of the hydraulic pressure normally used to operate the system.

Further objects and advantages of this invention will be apparent from the following detailed description of a presently-preferred embodiment thereof, which is shown schematically in the single figure of the accompanying drawing.

Referring to the drawing, the system shown schematically therein comprises a hydraulic liquid reservoir or sump 10, a pump 11, a manually-operable open-center valve 12 connected to the pump output, a master cylinder 13 having a master piston 14 therein, and a slave cylinder 15 having a slave piston 16 therein which is coupled mechanically to the ground wheels 17 of the vehicle.

As shown schematically in the drawing, the housing of the open-center valve 12 has an inlet port 18 which is connected to the outlet side of pump 11 through a check valve 19. A pair of axially spaced return ports 20 and 21 in the open-center valve are connected to a return line 22 leading back to the sump 10. The open-center valve also has a first motor port 23 located at one side of the inlet port 18 and connected through a line 24 to the slave cylinder 15 at one side of the slave piston 16 therein, and a second motor port 25 located at the opposite side of inlet port 18 and connected through a passage 26 to the master cylinder 13 at one side of the master piston 14 therein. A passage 27 for captive hydraulic liquid connects the master cylinder 13 at the opposite side of the master piston 14 to the slave cylinder 15 at the opposite side of the slave piston 16 at all times.

The housing of the open-center valve 12 is formed with an axial bore 28 which slidably receives a reciprocable valve spool 29 having three axially spaced valve elements 30, 31 and 32. The left end valve element 30 is selectively engageable with a valve seat 33 to control the fluid communication between return port 20 and the second motor port 25. The middle valve element 31 is selectively engageable with axially spaced valve seats 34 and 35 to control the respective fluid flows between inlet port 18 and the two motor ports 25 and 23. The right end valve element 32 is selectively engageable with a valve seat 36 to control the fluid communication between return port 21 and the first motor port 23.

In the neutral or open-center position of valve spool 29 its left end valve element 30 is spaced from the corresponding valve seat 33, its middle valve element 31 is spaced from both valve seats 34 and 35, and its right end valve element 32 is spaced from the respective valve seat 36. Therefore, in this position of the valve spool, the inlet port 18, the first and second motor ports 23 and 25, and the return ports 20 and 21 are all in fluid communication with one another.

When the valve spool is displaced to the left, as shown in the drawing, its middle valve element 31 sealingly engages valve seat 34 and its right end valve element 32 sealingly engages valve seat 36. In this position, therefore, the inlet port 18 is connected to the first motor port 23 and is blocked from the second motor port 25, the second motor port 25 is connected to return port 20, and the first motor port 23 is blocked from return port 21.

Conversely, when valve spool 29 is displaced to the right, its left end valve element 30 sealingly engages valve seat 33 and its middle valve element 31 sealingly engages valve seat 35. Under these conditions, the inlet port 18 is connected to the second motor port 25 and is blocked from the first motor port 23, the first motor port 23 is connected to return passage 21, and the second motor port 25 is blocked from return port 20.

Valve spool 29 is connected to a shaft 37 on which the steering wheel 38 is mounted. Shaft 37 has a screw-threaded portion 37a which extends through, and threadedly engages, the master piston 14. Piston 14 is held against rotation in cylinder 13 by a tube 26a, which is fixedly supported by the cylinder and extends slidably through the piston in fluid tight fashion and defines the right end portion of passage 26.

When the steering wheel 38 is turned the hydraulic liquid, which fills master cylinder 13 on opposite sides of piston 14, opposes axial movement of piston 14 and the latter remains substantially fixed, initially. The screw-threaded engagement at 37a between piston 14 and steering shaft 37 causes the shaft to move axially as it is turned, carrying with it the valve spool 29. The direction of axial movement of the valve spool depends upon the direction in which steering wheel 38 is turned.

In one practical embodiment this steering unit, composed of master cylinder 13, master piston 14, steering shaft 37 and open-center valve 12, is constructed as shown in detail in the co-pending U.S. patent application of John D. Allen, Serial No. 135,812, filed September 5, 1961, now Patent No. 3,114,242, issued December 17, 1963, assigned to the same assignee as the present invention. This steering unit normally will be located remote from the slave cylinder and piston 15, 16.

The slave piston 16 is shown as carrying a rack 40 which drives a pinion 42 connected to the ground-engaging wheels 17 which control the direction of movement of the vehicle. However, it is to be understood that any other suitable coupling between the slave piston and these wheels may be provided, if desired.

In the operation of the system, as thus far described, the pump 11 draws suitable hydraulic liquid, such as oil, from the sump 10 and forces it through check valve 19 to the inlet port 18 of open center valve 12.

If valve spool 29 is in its neutral, open-center position, the hydraulic liquid is simply recirculated through the open-center valve to the return line 22 leading back to the sump.

If the steering wheel 38 is turned to the right, valve spool 29 will move axially to the left. The pump liquid at inlet port 18 of valve 12 flows out through the first motor port 23 and through line 24 to the right side of slave piston 16, forcing the latter to the left. Such movement of slave piston 16 forces liquid out of the left end of slave cylinder 15 and through passage 27 into the left end of master cylinder 13, forcing the master piston 14 to the right. Such movement of the master piston forces liquid out of the right end of master cylinder 13 and through passage 26 to the second motor port 25 in open-center valve 12, and from here it flows out the return port 20 to the return line 22 leading back to the sump.

Conversely, if the steering wheel is turned to the left, valve spool 29 will move axially to the right. The pump liquid at inlet port 18 of valve 12 flows out through the second motor port 25 and passage 26 to the right side of master piston 14, forcing the latter to the left. Such movement of the master piston forces liquid out of the left end of master cylinder 13 and through passage 27 into the left end of slave cylinder 15, forcing the slave piston 16 to the right. This movement of the slave piston forces liquid out of the right end of slave cylinder 15 and through passage 24 to the first motor port 23 in the open-center valve, and from here it flows through return port 21 to the return line 22.

In accordance with the present invention, the system is provided with a novel arrangement for positively synchronizing the movements of the slave piston 16 and the master piston 14. Even if the operator turns the steering wheel 38 faster than the pump 11 can pump liquid to the system, the master and slave pistons cannot get out of synchronization.

As shown in the drawing, this arrangement includes a counterbalance valve 50 connected to the return line 22 between the open-center valve 12 and the sump 10.

Valve 50 has an inlet port 51, an outlet port 52 and a pilot pressure port 54. Inlet port 51 is connected through a passage 53 to the return line 22.

In the particular embodiment illustrated, the housing of the counterbalance valve is formed with a bore 55 communicating with its outlet port 52, and a counterbore 56 extending coaxially from the inner end of bore 55 and communicating with the inlet port 51. A sleeve 57 is fixedly mounted in bore 55 and counterbore 56, presenting an annular external shoulder 58 which abuts against an internal shoulder 59 on the housing at the juncture between bore 55 and counterbore 56. Sleeve 57 carries an O-ring seal 60 engaging the housing bore 55. A plug 61 is threadedly received in the valve housing to the right of counterbore 56. This plug engages the right end of sleeve 57 and positions the sleeve axially as shown. An O-ring seal 62 is provided between the plug and the valve housing.

At its left end, sleeve 57 presents an axial passage 63 which is open to the outlet port 52. Sleeve 57 also is formed with a cylindrical axial chamber 64 of larger diameter than passage 63 and coaxial with the latter and intersecting the latter at an internal annular shoulder 65 on the sleeve. A plurality of circumferentially spaced, radial openings 66 in the sleeve provide fluid communication between its chamber 64 and the valve housing counterbore 56.

A hollow outer valve member 67 is slidably disposed in the sleeve chamber 64. At its left end this valve member presents a frusto-conical surface 68 which normally sealingly engages the inside corner of the internal shoulder 65 on the sleeve at the juncture between the sleeve passage 63 and the sleeve chamber 64. Just to the right of this sealing surface 68, the outer valve member has an outer cylindrical surface 69 of smaller diameter than the sleeve chamber 64, so that an annular space is provided around the outer valve member at this location. This annular space communicates with the radial openings 66 in the sleeve. At its right end the outer valve member has a cylindrical portion with a sliding fit in the sleeve chamber 64.

The outer valve member 67 has an internal, axial, cylindrical chamber 70, which is open at its right end, and a plurality of circumferentially spaced, radial openings 71 providing fluid communication between this chamber 70 and the sleeve passages 66. At the left end of its chamber 70, the outer valve member 67 presents an internal annular shoulder 72. An elongated cylindrical modulating passage 73 in the outer valve member extends from this shoulder into the axial passage 63 in the sleeve.

The counterbalance valve also includes an inner valve member or poppet 74 having an axial passage 75 extending throughout its length. An oblique bore 76 extends from passage 75 to a location on the left end of the poppet which is always open to the sleeve passage 63.

Poppet 74 presents an enlarged annular shoulder 77 which is sealingly engageable with the internal shoulder 72 on the outer valve member. To the left of its shoulder 77, the poppet presents a tapered nose 78 extending through the modulating passage 73 in the outer valve member and having a progressively greater clearance therein in a direction to the left in the drawing.

Poppet 74 carries an O-ring 79 which sealingly engages a bore 80 in plug 61. By virtue of this O-ring seal and the longitudinal passage 75, 76, the poppet is partially pressure balanced.

A coil spring 81, engaged under compression between plug 61 and the enlarged shoulder 77 on the poppet, biases the poppet into sealing engagement with the valve seat constituted by the internal shoulder 72 on the outer valve member 67, and also biases the outer valve member into sealing engagement with the valve seat constituted by the inside corner of the internal shoulder 65 on sleeve 57.

Between the bore 55 and pilot passage 54 the housing of the counterbalance valve has a bore 81 which slidably receives a piston 82 carrying an O-ring 83. The piston has a reduced diameter nose 84 at its right end which projects into the passage 63 in sleeve 57.

The pilot pressure port 54 is connected through a passage 54a to the passage 27 which interconnects the left ends of the master and slave cylinders 13 and 15. The liquid trapped in this passage between the left ends of the master and slave pistons 14 and 16 exerts a pressure at port 54 which normally is effective to force piston 82 to a position in which it unseats the poppet valve 74 to permit return flow through the counterbalance valve from inlet port 51 to outlet port 52.

The outlet port 52 of the counterbalance valve is connected through a passage 85 to the inlet port 86 of a pressure-responsive valve 87. The outlet port 88 of this valve is connected through a return line 89 directly to the sump 10. A ball valve member 90 in valve 87 is biased by a spring 91 into engagement with a valve seat 92 to prevent the flow of liquid through the valve from inlet port 86 to outlet port 88. A piston 93 in this valve is connected to the output side of pump 11 and it carries a stem 94 for engaging and unseating the ball valve member 90. As long as there is sufficient pump pressure, piston 93 will maintain ball valve member 90 unseated to permit return flow through valve 87 to the sump.

The system also includes a check valve 95 connected between return line 22 and the inlet port 18 of open-center valve 12. This check valve has a very light spring which maintains it closed as long as the pump pressure exceeds the pressure in return line 22. It opens, to pass liquid from return line 22 to the line leading to the inlet port 18 of valve 12, if the pressure in return line 22 exceeds the pump pressure.

In the operation of this system, the direction in which the steering wheel 38 is turned determines the connections between the inlet port 18, the two motor ports 23 and 25, and the return ports 20 and 21 in the open-center valve 12. Regardless of which way the steering wheels are turned, after the system has been filled with hydraulic liquid and the air bled out, there is a substantially captive volume of liquid trapped between the left ends of the master and slave pistons 14 and 16, line 27 connecting them, and pilot pressure line 54a. This trapped liquid exerts a pressure on piston 82 which positively controls the return flow from return line 22 through counterbalance valve 50 to the sump. The rate of this return flow cannot substantially exceed the pump output flow rate.

This arrangement of the counterbalance valve 50 in the present system is particularly important in a situation where the operator may turn the steering wheel 38 abruptly for a hard right turn at a time when the pump output is low (such as, at low tractor engine speeds). Under such conditions, the operator first opens valve 12 quickly and then moves master piston 14 manually to the right rather abruptly.

Such movement of master piston 14 takes place as follows: After the valve spool 29 has reached its limit of movement axially to the left, as the steering wheel is turned to the right (i.e., clockwise as viewed by the operator), continued turning of the steering wheel to the right will cause the master piston 14 to move axially to the right along the screw-threaded portion 37a of the steering shaft. That is, with the steering shaft 37 positively restrained against further movement axially to the left, due to the engagement of the valve spool 29 against the respective valve seats, continued turning of the steering wheel to the right will cause the master piston 14 to move axially in the opposite direction from the direction in which the steering shaft 37 and valve spool 29 moved axially initially. Thus, if the steering wheel was turned clockwise (for a right turn) and the valve spool 29 was moved axially to the left, as shown in the drawing, master piston 14 will move axially to the right.

Such movement of the master piston forces hydraulic liquid out of the right end of master cylinder 13 and through passage 26 to the motor port 25 of valve 12 and thence through its return port 20 to the return line 22. This liquid flow from the right end of the master cylinder is at a faster rate than liquid is being pumped by pump 11 through valve 12 to the right end of the slave cylinder. Accordingly, if this liquid flow from the right end of the master cylinder to return line 22 continued unrestricted through the counterbalance valve 50 and valve 87 to the sump 10, the master piston 14 would outrun the slave piston 16, and the wheels 17 would make only a slow right turn instead of the hard right turn intended by the operator.

This is positively avoided in the present invention because the abrupt movement of master piston 14 to the right, under conditions of low pump pressure, produces a reduction of the pressure of the captive liquid trapped between the left ends of the master and slave pistons. Consequently, the pilot pressure at port 54 acting on piston 82 drops, and the poppet 74 in the counterbalance valve moves to restrict the return flow from return line 22 to the sump. The fluid pressure in line 22 increases to a value exceeding the pump pressure and it opens check valve 95, so that some of the liquid flowing from the right end of master cylinder 13 combines with the pump output and flows to the inlet port 18 of valve 12 and thence to the right end of the slave cylinder 15. Consequently, the flow rate to the right end of the slave cylinder is substantially equal to the flow rate from the right end of the masted cylinder, so that the slave piston 16 moves in synchronism with the master piston 14. The restricted return flow rate through the counterbalance valve 50 is substantially equal to the flow rate produced by pump 11 alone. Thus, the counterbalance valve automatically regulates the return flow rate to the sump, keeping it substantially equal to the flow rate delivered by the pump, and it also insures that the master and slave pistons stay synchronized. At the same time, the system permits the operator to turn the steering wheel for a hard right turn, and the wheels 17 turn hard right, even when the pump pressure is insufficient to produce such a hard right turn.

In the event that the operator turns the steering wheel 38 abruptly for a hard left turn, the resulting quick movement of master piston 14 to the left causes hydraulic liquid to flow out of the left end of the master cylinder and through line 27 into the left end of the slave cylinder 15, so that the slave piston 16 will stay synchronized with the master piston. The return flow rate from return line 22 through counterbalance valve 50 is substantially equal to the flow rate delivered by pump 11 under these conditions, also because the extent to which the counterbalance valve poppet 74 is unseated depends upon the pressure of the liquid trapped between the left ends of the master and slave pistons 14 and 16.

In the event of a failure of the pump pressure, the system can be operated entirely through manual power.

If the steering wheel 37 is turned clockwise (for a right turn), valve spool 29 first will move axially to the left to the limit of its movement, after which continued turning of the steering shaft in the same direction will cause master piston 14 to move axially to the right, as already described.

Conversely, if the steering wheel is turned counter-clockwise (for a left turn), valve spool 29 will first move axial to the right to the limit of its movement, after which continued turning of the steering shaft in the same direction will cause master piston 14 to move axially to the left due to the screw-threaded connection 37a between the steering shaft and the master piston.

With the pump pressure having failed, the pressure-responsive valve 87 will have closed, thereby preventing return flow to the sump 10.

Assuming that master piston 14 is moved to the right entirely under manual power, it will force liquid out of the right end of master cylinder 13 through passage 26 to the second motor port 25 in the open-center valve 12. From this motor port, the liquid will flow out the return port 20, through return line 22, past check valve 95 (because of the blockage of the return path to the sump by the now-closed valve 87), to the inlet port 18 of the open-center valve and from there through the first motor port 23 and line 24 to the right end of slave cylinder 15. This causes movement of the slave piston 16 to the left, forcing liquid out of the left end of slave cylinder 16 and from there through line 27 into the left end of master cylinder 13.

Conversely, if master piston 14 is moved manually to the left, it will force liquid out of the left end of master cylinder 13 and through passage 27 into the left end of slave cylinder 15, forcing the slave piston 16 to the right. Such movement of the slave piston forces liquid out of the right end of salve cylinder 15 and through line 24 to the first motor port 23 in the open-center valve 12. From here the liquid flows out the return port 21 to return line 22 and thence past check valve 95 to the inlet port 18 of the open-center valve. From here the liquid flows out the second motor port 25 and through passage 26 into the right end of master cylinder 13.

An important advantage of the present system is that liquid slippage, which would gradually cause the master and slave pistons to get out of synchronism, is minimized. Once the pump is turned on, valves 19 and 87 open, counterbalance valve 50 is open, and check valve 95 remains closed, and each of these valves remains in this condition as long as the pump pressure is maintained and regardless of the direction in which the operator may turn the steering wheel. This is in contrast to prior power steering systems in which several valves are required to open or close each time the steering wheel is reversed, with the consequent possibility of liquid slippage at each such valve every time it opens or closes. In the present system the valves 19 and 86 close and check valve 95 opens only when the pump is turned off or pump pressure fails, requiring manual steering.

While a presently-preferred embodiment of the invention has been described in detail and illustrated schematically in the accompanying drawing, it is to be understood that various modifications, omissions and refinements which depart from the disclosed embodiment may be adopted without departing from the spirit and scope of the present invention.

I claim:

1. A remote control for a hydraulically driven device comprising:
    a master cylinder, a master piston in said master cylinder;
    a slave cylinder, a slave piston in said slave cylinder;
    valve means for selectively establishing the inlet flow of hydrauic liquid to one side of said master piston or to one side of said slave piston and establishing the return flow from said one side of the other of said pistons;
    captive passage means connecting the opposite side of said master piston to the opposite side of said slave piston for the flow of captive liquid trapped therebetween;
    and means responsive to the liquid pressure in said captive passage means for controlling said return flow.

2. A remote control for a hydraulically driven device comprising:
    a master cylinder, a master piston in said master cylinder;
    a slave cylinder, a slave piston in said slave cylinder;
    vlave means for selectively establishing the inlet flow of hydraulic liquid to one side of said master piston or to one side of said slave piston and establishing the return flow from said one side of the other of said pistons;
    captive passage means connecting the opposite side of said master piston to the opposite side of said slave piston for the flow of captive liquid trapped therebetween;
    and means operable in response to the liquid pressure in said captive passage means to maintain said slave piston synchronized with said master piston.

3. A remote control for a hydraulically driven device comprising:
    a master cylinder, a master piston in said master cylinder;
    a slave cylinder, a slave piston in said slave cylinder;
    valve means for selectively establishing the inlet flow of hydraulic liquid to one side of said master piston or to one side of said slave piston and establishing the return flow from said one side of the other of said pistons;
    passage means interconnecting the opposite side of said master piston and the opposite side of said slave piston;
    and means for regulating said return flow in accordance with said inlet flow.

4. A remote control for a hydraulically driven device comprising:
    a master cylinder, a master piston in said master cylinder;
    a slave cylinder, a slave piston in said slave cylinder;
    valve means for selectively establishing the inlet flow of hydraulic liquid to one side of said master piston or to one side of said slave piston and establishing the return flow from said one side of the other of said pistons;
    passage means interconnecting the opposite side of said master piston and the opposite side of said slave piston;
    and means for passing liquid from said return flow into said inlet flow when the pressure of said return flow exceeds the pressure of said inlet flow.

5. A remote control for a hydraulically driven device comprising:
    a master cylinder remote from said device, a master piston in said master cylinder;
    a slave cylinder, a slave piston in said slave cylinder coupled to said device;
    a source of hydraulic fluid under pressure;
    a return line for said fluid;
    manually operable valve means connected between said source, said return line, said master cylinder and said slave cylinder, said valve means in a first position thereof connecting said source to one side of said slave piston and connecting one side of said master piston to said return line, said valve means in a second position thereof connecting said source to one side of the master piston and connecting said one side of the slave piston to said return line;
    passage means connecting the opposite side of said master piston to the opposite side of said slave piston;
    a normally-closed valve in said return line;
    and means responsive to the pressure in said passage means for maintaining said normally closed valve open for return flow at a rate determined by the flow produced by said source.

6. The control of claim 5 wherein there is provided a check valve connected between said source and said return line ahead of said normally-closed valve, said check valve being closed when the source pressure exceeds the pressure in said return line, said check valve being operable to open when the pressure in said return line exceeds the source pressure.

7. A remote control for a hydraulically driven device comprising:
    a master cylinder remote from said device, a master piston in said master cylinder
    a slave cylinder, a slave piston in said slave cylinder connected to operate said device;
    a source of hydraulic liquid under pressure;
    a return line for said liquid;
    a manually operable open-center valve having an inlet port connected to said source, return ports connected to said return line, a first motor port connected to said slave cylinder at one side of said slave piston, a second motor port connected to said master cylinder at one side of said master piston, and reciprocable valve means controlling the respective flows between said inlet, return and motor ports, said reciprocable valve means in a first position thereof connecting said inlet port to said first motor port and connecting said second motor port to one of said return ports, said reciprocable valve means in a second position thereof connecting said inlet port to said second motor port and connecting said first motor port to the other of said return ports;
    captive passage means connecting said master cylinder at the opposite side of said master piston to said slave cylinder at the opposite side of said slave piston;
    a normally-closed counterbalance valve connected in said return line to control the return flow therethrough;
    and a movable pressure-responsive member exposed to the pressure in said captive passage means and engaging said counterbalance valve to hold the latter open for return flow through said return line at substantially the same rate as the flow produced by said source.

8. The remote control of claim 7, wherein there is provided a check valve connected between said inlet port of the open-center valve and said return line ahead of said counterbalance valve, said check valve being closed when the source pressure exceeds the pressure in said return line, said check valve being operative to open for flow from said return line to said inlet port when the pressure in said return line exceeds the source pressure.

9. The remote control of claim 8, wherein there are provided a normally-closed valve in said return line after said counterbalance valve, and means responsive to the pressure of said source for holding said last-mentioned valve open.

10. A hydraulic power steering system comprising:
a master cylinder, a master piston in said master cylinder, means preventing said master piston from rotating in said master cylinder;
a rotatable steering shaft in screw-threaded engagement with said master piston;
a slave cylinder, a slave piston in said slave cylinder;
a pump for pumping hydraulic liquid;
a return line for said liquid;
an open center valve having an inlet port connected to said pump, a first motor port at one side of said inlet port connected to said slave cylinder at one side of said slave piston, a second motor port at the opposite side of said inlet port connected to said master cylinder at one side of said master piston, return ports connected to said return line, and a reciprocable valve member connected to said steering shaft to move axially therewith, said reciprocable valve member in its neutral position connecting said inlet port and said motor ports to said return ports, said reciprocable valve member having a first operating position at one side of said neutral position in which it connects said inlet port to said first motor port and connects said second motor port to one of said return ports, said reciprocable valve member having a second operating position at the opposite side of said neutral position in which it connects said inlet port to said second motor port and connects said first motor port to the other of said return ports;
captive passage means connecting said master cylinder at the opposite side of said master piston and said slave cylinder at the opposite side of said slave piston;
a normally-closed counterbalance valve connected in said return line to control the return flow therethrough;
and a piston engaging said counterbalance valve and exposed to the pressure in said captive passage means to hold said counterbalance valve open for return flow therethrough at substantially the same rate as the flow produced by said pump.

11. The steering system of claim 10 wherein there is provided a check valve connected between said inlet port of the open-center valve and said return line ahead of said counterbalance valve, said check valve being operative to open for flow from said return line to said inlet port when the pressure in said return line exceeds the pump pressure.

12. The steering system of claim 11 wherein there are provided a normally-closed valve in said return line after said counterbalance valve, and means responsive to the output pressure of said pump for maintaining said last-mentioned valve open.

References Cited by the Examiner
UNITED STATES PATENTS
3,002,501  10/61  Banker _____ 60—54.5

JULIUS E. WEST, *Primary Examiner.*